US012546575B2

(12) United States Patent
Cerecke

(10) Patent No.: US 12,546,575 B2
(45) Date of Patent: Feb. 10, 2026

(54) PLATED BISMUTH SHOT

(71) Applicant: DLM Holding Group LLC, Bridgeman, MI (US)

(72) Inventor: Brandon Cerecke, Bridgeman, MI (US)

(73) Assignee: DLM HOLDING GROUP LLC, Bridgman, MI (US)

( * ) Notice: Subject to any disclaimer, the term of this patent is extended or adjusted under 35 U.S.C. 154(b) by 38 days.

(21) Appl. No.: 17/608,835

(22) PCT Filed: May 6, 2020

(86) PCT No.: PCT/US2020/031591
§ 371 (c)(1),
(2) Date: Nov. 4, 2021

(87) PCT Pub. No.: WO2020/227358
PCT Pub. Date: Nov. 12, 2020

(65) Prior Publication Data

US 2022/0316845 A1 Oct. 6, 2022

Related U.S. Application Data

(60) Provisional application No. 62/843,704, filed on May 6, 2019.

(51) Int. Cl.

| | |
|---|---|
| ***F42B 7/04*** | (2006.01) |
| ***B32B 15/01*** | (2006.01) |
| ***B32B 15/20*** | (2006.01) |
| *C25D 7/00* | (2006.01) |

(52) U.S. Cl.
CPC .............. *F42B 7/046* (2013.01); *B32B 15/01* (2013.01); *B32B 15/20* (2013.01); *C25D 7/00* (2013.01)

(58) Field of Classification Search
CPC .......... F42B 7/046; F42B 12/80; C22C 12/00; B32B 15/01
See application file for complete search history.

(56) References Cited

U.S. PATENT DOCUMENTS 4,173,930 A * 11/1979 Faires, Jr. ............... F42B 7/046 102/451
4,479,438 A * 10/1984 Bilsbury ................... F42B 7/08 102/452
4,760,793 A 8/1988 Herring, III
4,881,465 A * 11/1989 Hooper ................. C22C 33/003 419/33
5,540,749 A * 7/1996 Li ............................ B22F 9/08 75/340
5,597,975 A 1/1997 Satow
6,149,705 A 11/2000 Lowden et al.
2005/0066850 A1* 3/2005 Leblanc .................... F42B 7/10 102/517

(Continued)

OTHER PUBLICATIONS

Merriam-Webster.com definition of 'shot' captured Jul. 21, 2023. (Year: 2023).*

(Continued)

*Primary Examiner* — Adam Krupicka
(74) *Attorney, Agent, or Firm* — Honigman LLP; Kelly T. Murphy; Andrew S. Chipouras

(57) ABSTRACT

This invention relates to plated bismuth shot for shotgun shells and methods of making.

17 Claims, 6 Drawing Sheets

(56) References Cited

U.S. PATENT DOCUMENTS

| | | | | |
|---|---|---|---|---|
| 2006/0042456 | A1* | 3/2006 | Petersen ................. | F42B 33/00 86/54 |
| 2011/0017354 | A1 | 1/2011 | Ferruelo et al. | |
| 2011/0185936 | A1* | 8/2011 | Richardson ............. | F42B 12/36 102/438 |
| 2014/0130698 | A1 | 5/2014 | Perez Trujillo et al. | |
| 2017/0089673 | A1 | 3/2017 | Burrow | |

OTHER PUBLICATIONS

Gun Tests, Steel 3-inch Magnum Loads Our Pick for Waterfowl Hunting, https://www.gun-tests.com/ammo/steel-3-inch-magnum-loads-our-pick-for-waterfowl-hunting/ Nov. 2, 2000 (Year: 2000).* www.ballisticproducts.com, The Wayback Machine—Copper-Plated Lead Shot (Year: 2012).*

Vickers Hardness of the Elements, https://periodictable.com/Properties/A/VickersHardness.v.log.html, captured May 30, 2025 (Year: 2025).*

International search report and written opinion for PCT/US20/31591, mailed Aug. 2020, 10 pages.

Hardness of Elements (data page). Wikipedia Oct. 26, 2018; URL: https://en.wikipedia.org/wiki/Hardnesses_of_the_elements_(data_page).

Extended Search Report for EP20801501.6 (8 pages).

Communication pursuant to Rule 114(2) EPC for EP Application No. 20200801501.

* cited by examiner

Non Plated Bismuth – 30 Yds
Average Penetration – 3.268"

Copper- Plated Bismuth – 30 Yds
Average Penetration – 3.757”

Non Plated Bismuth – 40 Yds
Average Penetration – 2.625”

Copper- Plated Bismuth – 40 Yds
Average Penetration – 3.160”

Non Plated Bismuth – 50 Yds
Average Penetration – 2.241”

Copper- Plated Bismuth – 50 Yds
Average Penetration – 2.657”

PLATED BISMUTH SHOT

CROSS-REFERENCE TO RELATED APPLICATIONS

This application is a 371 of International Application No. PCT/US2020/031591, filed May 6, 2020. This application also claims priority under 35 U.S.C. § 119 (e) to U.S. Provisional Patent Application No. 62/843,704, filed May 6, 2019. The entire contents of each of these applications are incorporated by reference herein.

TECHNICAL FIELD

This invention relates to plated bismuth shot for shotgun shells and methods of making.

BACKGROUND

Bismuth shot is used in shotgun shells as an alternative to shot made from other metals. USFW-approved bismuth shot products include, for example, those made from bismuth-tin alloys and bismuth-tin-tungsten alloys. A need exists for bismuth shot products with improved performance.

SUMMARY OF THE INVENTION

The present invention provides a plated bismuth shot comprising a substantially spherical core comprising bismuth; and a metal coating plated on the core, wherein the metal coating comprises a metal having a hardness greater than bismuth.

The plated bismuth shot has been demonstrated to have improved performance as described herein.

Figure 1:
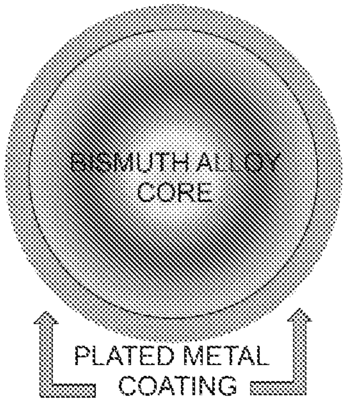
FIG. 1 is a representative cross section of a plated bismuth alloy shot pellet.

The figures are provided by way of example and are not intended to limit the scope of the invention.

DETAILED DESCRIPTION

The present invention provides a plated bismuth shot comprising a substantially spherical core comprising bismuth; and a metal coating plated on the core, wherein the metal coating comprises a metal or metal alloy having a hardness greater than bismuth.

The present invention also provides a shotgun shell comprising a cartridge loaded with a plurality of plated bismuth shot, each shot comprising a substantially spherical core comprising bismuth; and a metal coating plated on the core, wherein the metal coating comprises a metal having a hardness greater than bismuth. In some embodiments, the shotgun shell comprises additional suitable shotgun shell components, such as primer, gunpowder, wad, slug, shell case, and the like.

The plated bismuth shot comprises a bismuth core. For example, the core may comprise at least 50 wt % bismuth, at least 80 wt % bismuth, at least 90 wt % bismuth, about 90-99 wt % bismuth, about 92-98 wt % bismuth, about 94 wt % bismuth, or about 97 wt % bismuth.

The bismuth core may comprise a bismuth alloy. For example, the bismuth alloy may be a bismuth-tin alloy or a bismuth-tin-tungsten alloy. In some embodiments, the bismuth core consists essentially of bismuth or a bismuth alloy.

In some embodiments, the core comprises tin and/or tungsten. For example, the core may comprise up to about 10 wt % tin, up to about 6 wt % tin, about 1-10 wt % tin, about 1-6 wt % tin, about 3 wt % tin, or about 6 wt % tin. In some embodiments, the core comprises up to about 5 wt % tungsten, up to about 2 wt % tungsten, up to about 1 wt % tungsten, 0.01-1 wt % tungsten, 0.01-0.1 wt % tungsten, or trace amounts of tungsten.

In some embodiments, the bismuth core comprises a bismuth tin alloy that is about 90-99 wt % bismuth and about 1-10 wt % tin; in some examples, about 94-97 wt % bismuth and about 3-6 wt % tin; in other examples, about 97 wt % bismuth and about 3 wt % tin; and in yet other examples, about 94 wt % bismuth and about 6 wt % tin. In some embodiments, the bismuth-tin alloy further comprises trace amounts of tungsten.

The bismuth core is generally spherical in shape. In some embodiments, the core is spherical. In some embodiments, the core has a teardrop shape. In some embodiments, the bismuth core is solid. In some embodiments, the bismuth core has a diameter of from about 0.190-0.050 inches. Bismuth has a Brinell hardness of 70-94.2 MPa. Bismuth-tin alloys generally have a Brinell hardness of about 69-93 MPa.

The plated bismuth shot comprises a metal coating plated on the bismuth core. The metal coating comprises a metal or metal alloy with a hardness greater than bismuth. In some embodiments, the metal coating comprises copper, a copper alloy, nickel, a nickel alloy, or any combination thereof. In some embodiments, the metal coating comprises copper or a copper alloy. In some embodiments, the metal coating comprises nickel or a nickel alloy. In some embodiments, the metal coating comprises tin or a tin alloy.

The metal coating may comprise a single layer or multiple layers. For multi-layer embodiments, separate layers of the coating may comprise different metals (e.g., a copper layer and a nickel layer).

In some embodiments, the metal coating has a thickness of about 0.0005-0.02 inches. In some examples, the metal coating thickness is about 0.001-0.005 inches; in some examples, about 0.001-0.002 inches; in some examples, about 0.001-0.015 inches.

In some embodiments, the metal coating has a hardness of about 200-1600 MPa.

In some embodiments, the metal coating is plated on the bismuth core. For example, the metal coating may be electroplated on the bismuth core. Alternatively, the metal coating may be plated onto the bismuth core by a non-electroplating method.

In another aspect, provided is a method of making a plated bismuth shot, the method comprising providing a substantially spherical core comprising bismuth; and plating the core with a metal or metal alloy having a hardness greater than bismuth to form a metal coating on the core.

In some embodiments, the core is produced by a drip/water quench process, a lead type shot tower manufacture, or a Bleimeister method.

In some embodiments, the plating comprises electroplating. The electroplating may be performed by any suitable method known in the art for electroplating metals. For example, a copper electroplating bath set-up may be prepared with copper sulfate, sulfuric acid, and chloride with a current density of 20-100 ASF. And in another example, a nickel electroplating bath set-up may be prepared with nickel (free metal), nickel chloride, nickel sulfate, and boric acid.

In some embodiments, the copper electroplating bath comprises about 24-40 oz/gal of copper sulfate, about 4-10 oz/gal of sulfuric acid, and about 50-120 ppm of chloride. Additives may be included in the bath, such as molasses for hardness or thiourea for brightness. In some embodiments, the nickel electroplating bath comprises about 6-9 oz/gal of nickel (free metal), about 3-4 oz/gal of nickel chloride, about 20-40 oz/gal of nickel sulfate, and about 3-10 oz/gal of boric acid. Additives may be included in the nickel bath as well.

Another aspect is a shotgun shell comprising a cartridge loaded with a plurality of plated bismuth shot. In some embodiments, the plurality of plated bismuth shot is defined as a "payload." In some embodiments, the payload comprises plated bismuth shot of varying sizes. For example, the payload comprises a mixture of small and large plated bismuth shot; a mixture of small, medium and large plated bismuth shot, etc. In some embodiments, the payload comprises a first plurality of shot having a first volume, V1, and a second plurality of shot having a second volume, V2 (V1 and V2, referring to the volume of individual pieces of shot) wherein V1 is greater than V2. In some embodiments, the payload comprises from about 10 wt % to about 90 wt % (e.g., about 30-70 wt %, about 40-60 wt % or about 50 wt %) of the first plurality of shot having volume, V1, and from about 10 wt % to about 90 wt % of the second plurality of shot (e.g., about 30-70 wt %, about 40-60 wt %, or about 50 wt %). In some embodiments, the payload comprises from about 10% to about 90% (e.g., about 30-70%, about 40-60% or about 50%) of the individual pieces of shot having volume V1 by count, and from about 10% to about 90% (e.g., about 30-70%, about 40-60% or about 50%) of the individual pieces of shot having volume V2 by count. In some embodiments the small shot has a shot size that is two shot sizes less than the larger shot. For example, the small shot is size 1 and the large shot is size 3; the small shot is size 2 and the large shot is size 4; the small shot is size 3 and the large shot is size 5; and so on.

EXAMPLES

Example 1

The following test conditions were used to test the performance of the plated bismuth shot against a non-plated bismuth shot control.

| Gun | Choke | Boss Shotshell |
|---|---|---|
| Benelli SBE | Factory Full | 2¾" 1¼ oz. #5 @ 1350 |

Rounds were fired at a target using the specified test conditions at distances of 30, 40 and 50 yards. Hits on the target were counted versus those that missed the target to determine a hit percentage. The results are shown in Table 1.

TABLE 1

| Shot Type | Yards | Hits | Hit Percentage |
|---|---|---|---|
| Non-Plated Bismuth (Control) | 30 | 218 | 87% |
| Copper-Plated Bismuth (Test) | 30 | 246 | 100% |
| Non-Plated Bismuth (Control) | 40 | 167 | 68% |
| Copper-Plated Bismuth (Test) | 40 | 189 | 77% |
| Non-Plated Bismuth (Control) | 50 | 105 | 43% |
| Copper-Plated Bismuth (Test) | 50 | 145 | 59% |

Figure 2A:
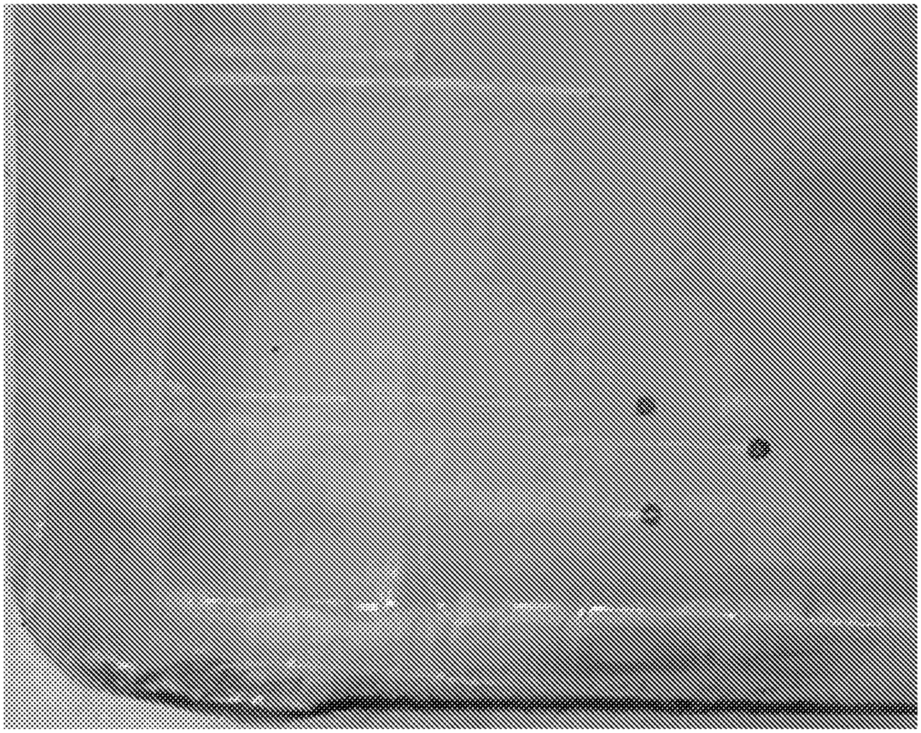
FIGS. 2A-2F illustrate the depth the shot pellets penetrated the ballistics gel using the specified test conditions at distances of 30, 40 and 50 yards as described in Example 1.
Figure 2B:
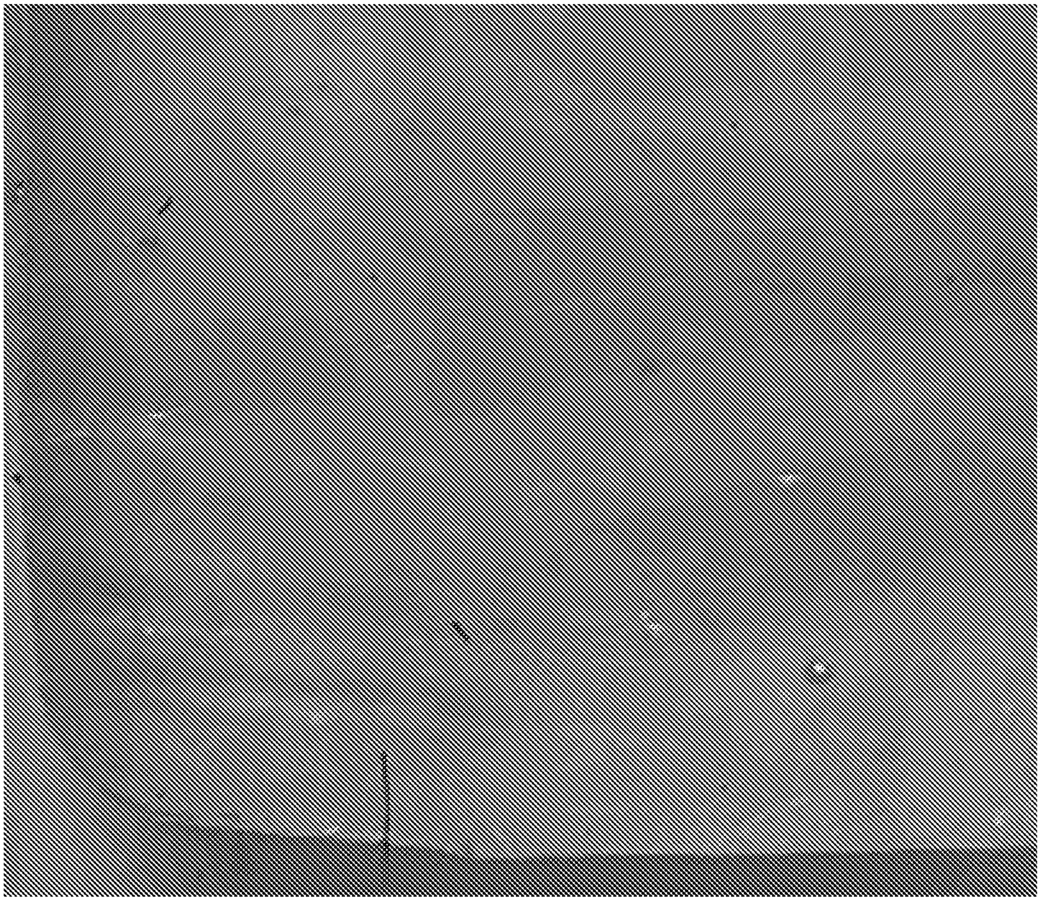
Figure 2C:
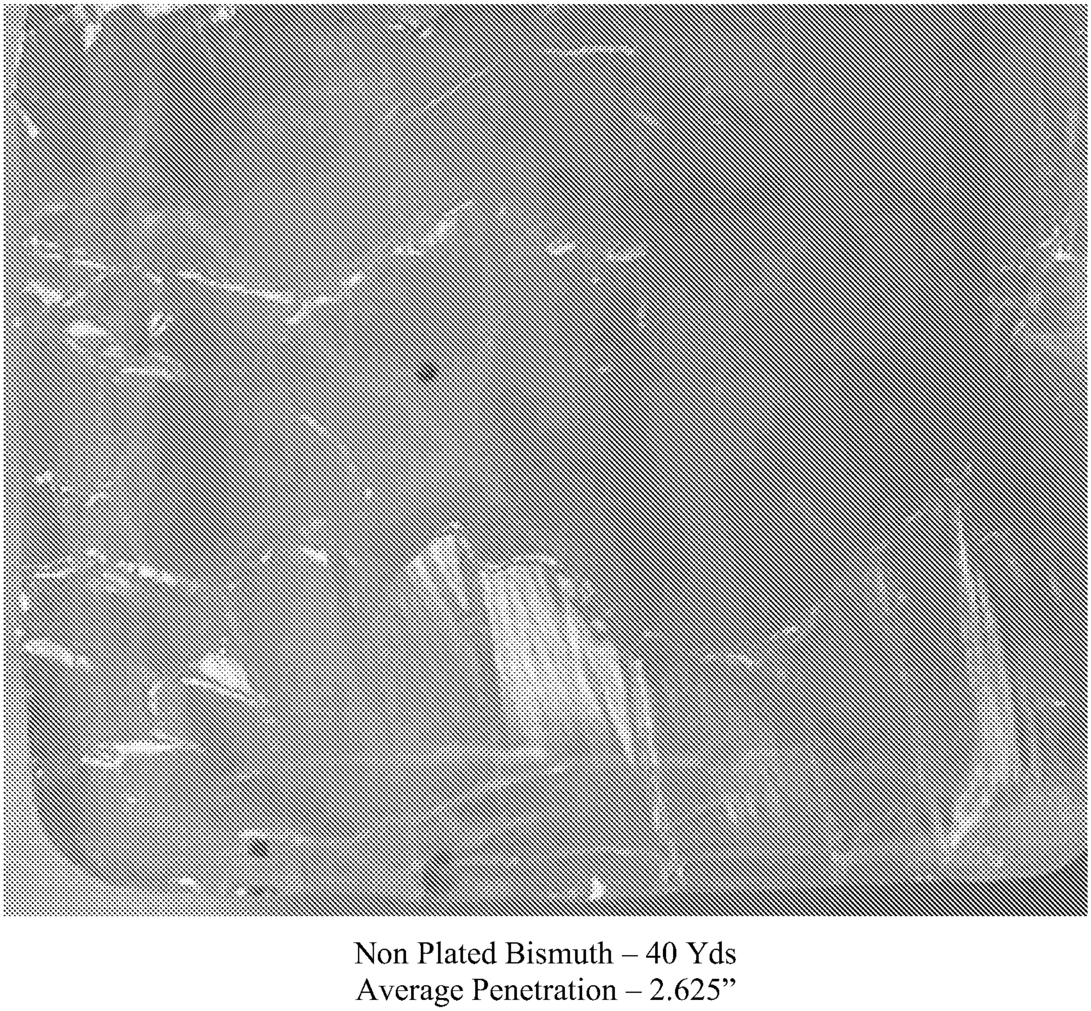
Figure 2D:
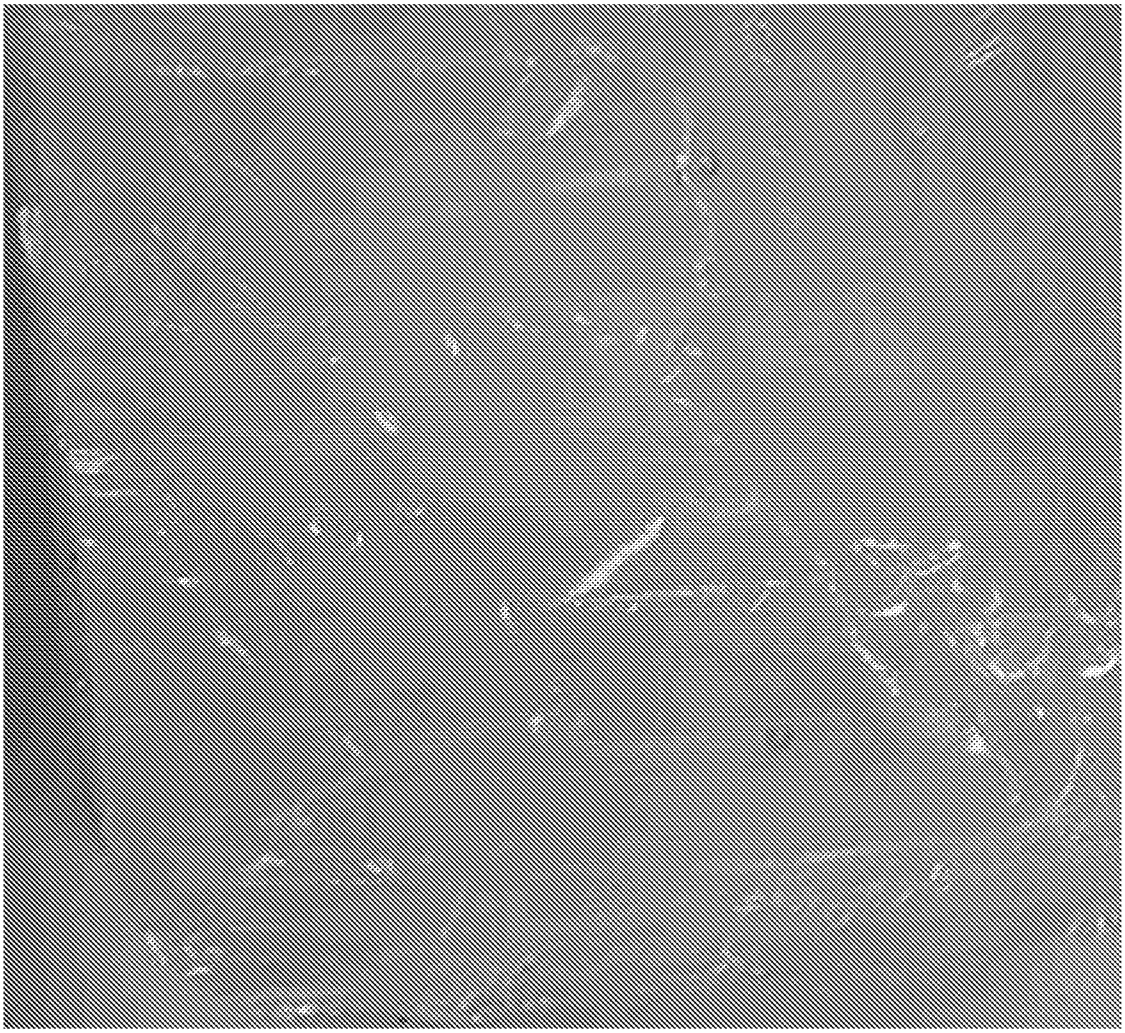
Figure 2E:
Figure 2F:
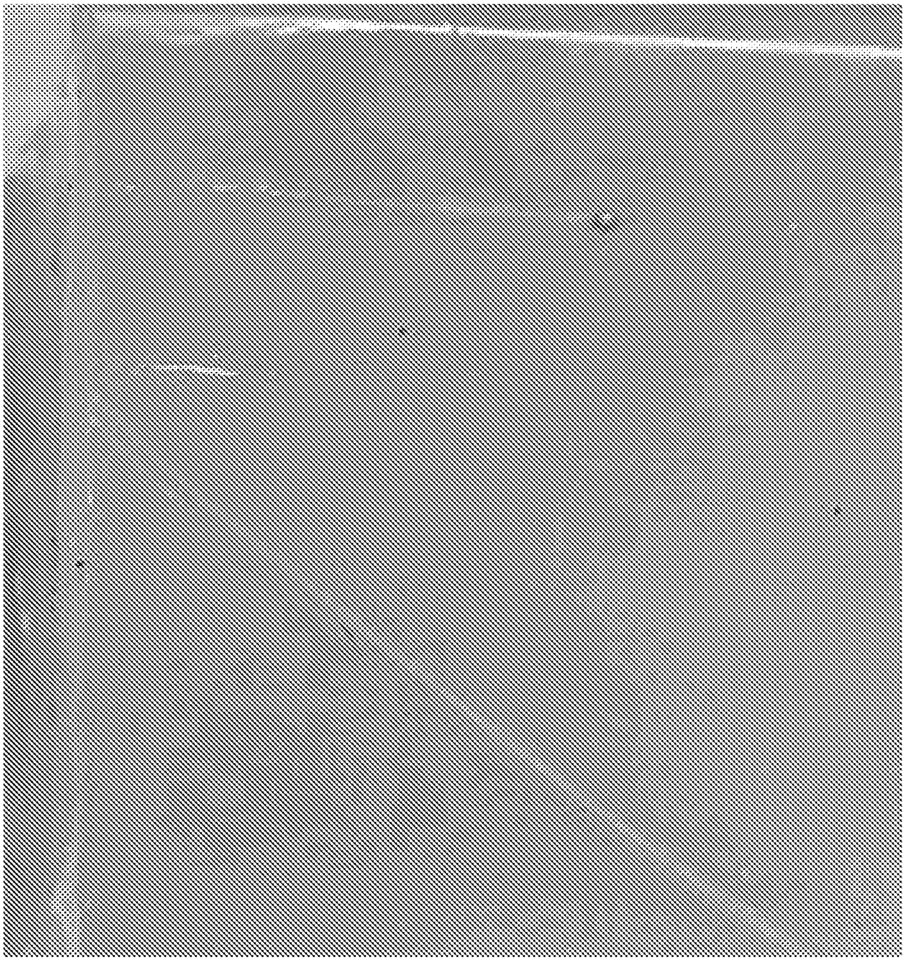

Rounds were fired at ballistics gel using the specified test conditions at distances of 30, 40 and 50 yards. The depth the shot pellets penetrated the gel were measured and recorded. The percentage increase in depth of penetration for Copper-Plated Bismuth over the Bismuth Control were calculated and recorded. Results are shown in Table 2 and FIGS. 2A-2F.

TABLE 2

| Yards | Percentage Increase Depth of Penetration Non-Plated Bismuth (Control) .vs. Copper Plated Bismuth (Test) |
|---|---|
| 30 | 14.96% |
| 40 | 20.38% |
| 50 | 18.56% |

Example 2

A ⅗ mix (mixture of size 3 and size 5 shot) of plated bismuth shot was tested in the field by industry experts and professional hunting guides. The ⅗ mix of plated bismuth shot was used to kill birds (Giant Canada Geese) from 10 to 88 yards. Clean kills were noted and all meat harvested was usable. Without being bound by theory, the mixture of shot sizes is believed to increase long range killing ability due to the larger shot delivering more energy to the target while at the same time having smaller shot to fill in the pattern and delivery multiple hits in vital areas such as the head/neck or multiple abdominal strikes. The mixture of shot sizes is also believed to be less likely to cause unnecessary trauma that would render meat unusable, which can otherwise occur when an animal is shot at close range with large pellet strikes with a load containing all larger shot.

OTHER EMBODIMENTS

It should be apparent that the foregoing relates only to the preferred embodiments of the present invention and that numerous changes and modifications may be made herein without departing from the spirit and scope of the invention as defined by the following claims and equivalents thereof.

What is claimed is:

1. A shotgun shell comprising a cartridge loaded with a plurality of plated bismuth shot, wherein each plated bismuth shot comprises:

a substantially spherical core comprising a bismuth alloy, wherein the bismuth alloy comprises bismuth and tin; and a metal coating plated on the core;

wherein the metal coating comprises a metal or metal alloy having a hardness greater than bismuth;

wherein the metal coating has a thickness of from about 0.0005 to about 0.02 inches;

wherein the plurality of plated bismuth shot comprises a mixture of small shot and large shot.

2. The shotgun shell of claim 1, wherein the core comprises at least about 80 wt % bismuth.

3. The shotgun shell of claim 1, wherein each core comprises a bismuth-tin alloy.

4. The shotgun shell of claim 1, wherein each core comprises a bismuth-tin-tungsten alloy.

5. The shotgun shell of claim 1, wherein each core consists essentially of a bismuth alloy.

6. The shot of claim 1, wherein the core is a solid core with a diameter of from about 0.19 to about 0.05 inches.

7. The shotgun shell of claim 1, wherein each metal coating comprises copper, a copper alloy, nickel, a nickel alloy, or any combination thereof.

8. The shotgun shell of claim 7, wherein each metal coating comprises copper or a copper alloy.

9. The shotgun shell of claim 7, wherein each metal coating comprises nickel or a nickel alloy.

10. The shotgun shell of claim 1, wherein each metal coating comprises tin or a tin alloy.

11. The shotgun shell of claim 1, wherein each metal coating has a thickness of from about 0.001 to about 0.002 inches.

12. The shotgun shell of claim 1, wherein each metal coating comprises two or more layers plated on the core.

13. The shotgun shell of claim 1, wherein each metal coating consists essentially of copper, a copper alloy, nickel, a nickel alloy, or any combination thereof.

14. The shotgun shell of claim 1, wherein each metal coating is plated on the core by an electroplating process.

15. The shotgun shell of claim 1, wherein the large shot is size 3 shot and small shot is size 5 shot.

16. A shotgun cartridge loaded with plated bismuth shot, wherein the cartridge comprises a plurality of plated bismuth shot comprising a mixture of small shot and large shot;

wherein the plated bismuth shot comprises:

a substantially spherical core comprising an alloy of bismuth and tin; and a copper coating plated on the core, wherein the copper coating comprises a copper or copper alloy having a hardness greater than bismuth and wherein the copper coating has a thickness of from about 0.0005 to about 0.02 inches.

17. The shotgun shell of claim 16, wherein the large shot is size 3 shot and small shot is size 5 shot.

* * * * *